(12) United States Patent
Steinkopf

(10) Patent No.: US 11,745,298 B2
(45) Date of Patent: Sep. 5, 2023

(54) METHOD FOR CORRECTING TOOL PARAMETERS OF A MACHINE TOOL FOR MACHINING OF WORKPIECES

(71) Applicant: HEXAGON TECHNOLOGY CENTER GMBH, Heerbrugg (CH)

(72) Inventor: Malte Steinkopf, Frankenthal (DE)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 350 days.

(21) Appl. No.: 17/017,843

(22) Filed: Sep. 11, 2020

(65) Prior Publication Data

US 2021/0078126 A1 Mar. 18, 2021

(30) Foreign Application Priority Data

Sep. 12, 2019 (EP) ..................................... 19197125

(51) Int. Cl.
*B23Q 15/22* (2006.01)
*G05B 19/404* (2006.01)
*B23Q 17/20* (2006.01)

(52) U.S. Cl.
CPC ............ *B23Q 15/22* (2013.01); *B23Q 17/20* (2013.01); *G05B 19/404* (2013.01); *B23Q 2717/006* (2013.01)

(58) Field of Classification Search
None
See application file for complete search history.

(56) References Cited

U.S. PATENT DOCUMENTS

| 4,881,021 | A | 11/1989 | Hirai |
| 6,368,879 | B1 | 4/2002 | Toprac |
| 6,449,526 | B1 | 9/2002 | Sachs et al. |
| 2014/0222376 | A1 | 8/2014 | Kao et al. |
| 2016/0202681 | A1 | 7/2016 | Keil et al. |
| 2020/0301391 | A1* | 9/2020 | Kim ...................... B23Q 17/09 |

FOREIGN PATENT DOCUMENTS

| CN | 102914995 A | 2/2013 |
| DE | 195 44 240 A1 | 6/1996 |
| DE | 103 05 196 A1 | 8/2004 |
| JP | S60201861 A | 10/1985 |

OTHER PUBLICATIONS

European Search Report dated Mar. 12, 2020 as received in Application No. 19197125.8.
Office Action from corresponding EP Application No. 19197125.8, dated Dec. 23, 2021.

* cited by examiner

*Primary Examiner* — Ryan A Jarrett
(74) *Attorney, Agent, or Firm* — Maschoff Brennan

(57) ABSTRACT

A method for correcting tool parameters of a machine tool for machining workpieces includes recording measurement values of measured characteristics as actual values of at least one workpiece machined with the machine tool. The measurement values are compared with the default set values of the workpiece. The measurement values of at least two measured characteristics are recorded from at least two parameters of at least one measured characteristic and/or from at least one measured characteristic and from at least one parameter. An average for a tool correction value is calculated from the measurement values and the corresponding set values, with which a correction of the machine tool is performed.

21 Claims, 7 Drawing Sheets

METHOD FOR CORRECTING TOOL PARAMETERS OF A MACHINE TOOL FOR MACHINING OF WORKPIECES

FIELD OF THE INVENTION

The invention refers to a method for correcting tool parameters of a machine tool for machining of workpieces.

BACKGROUND

In the industrial manufacture of goods, such as cars, for example, it is common practice to measure measured characteristics and parameters of the various components. These measurements can be carried out in special measuring cells with contacting or non-contacting measuring devices, for example by measuring robots, as known from DE 195 44 240 A1.

The purpose of such methods is to determine possible defects of the measured object during product development, product launch or during manufacturing. The disadvantage of this method is that various additional errors can occur during the measuring process, which prevent or make it more difficult to determine the defects of the object. The quantities manufactured in a controlled manufacturing process can be in a range between one-piece production and mass production. The parts are manufactured in a production facility where different manufacturing techniques and technologies can be integrated. Depending on the specific manufacturing technology, the installation procedures of the plant may vary. For example, if the parts are produced by milling or turning, the production plant may include a CNC machine, including programming means but also electronic control equipment.

The workpieces to be manufactured are specified by the nominal data in a drawing and/or CAD model, which define the theoretical dimensions of the workpiece in combination with suitable tolerances. The tolerances define the accepted deviations between the given theoretical dimensions of the nominal data and the actual dimensions of a manufactured workpiece.

The manufacturing processes also include a quality inspection step, where measures are taken to ensure the desired quality of the manufactured parts, i.e. to ensure that the percentage of "good" parts does not come below a defined minimum. The quality inspection step consists of two sub-steps:

a measuring step to determine the quality of the manufactured parts by measuring suitable measured characteristics and parameters with a suitable measuring device;

and a correction step to improve the production quality if the results of the measurement step show unsatisfactory figures.

Nowadays, in manufacturing processes of the type described above, the measuring device that records the quality of the manufactured workpieces can be, for example, a coordinate measuring machine or an articulated arm measuring device, for example, an arm of the measuring robot.

If the measurements show that the deviations between the dimensions of the measured parts and the theoretical values defined in the nominal data exceed the accepted tolerances, suitable parameter values of the production plant are changed to compensate for these manufacturing defects. For example, on a CNC machine this could be the case if a milling tool changes its properties due to wear.

This change of the parameter values is, as known from practice, carried out manually by experienced operators. This has the disadvantage that only operators with a very good knowledge of the general installation procedures of the plant, the current structure of the plant and the cause of the manufacturing defects can make changes in the parameter values.

This requires highly qualified personnel and furthermore, in many cases a time-consuming and costly trial-and-error method is required, as the cause of manufacturing defects is often not precisely known.

In the state of the art (US 2016/0202681 A), due to this reason it is proposed to use a method to control a manufacturing process of an object in a production module and to compensate for errors occurring in the manufacturing process, which method includes the generation of actual property data, in order to avoid the described disadvantages. This involves a sample object manufactured according to the manufacturing model. According to this state of the art, when defects are detected, an adjusted manufactured model is produced.

Furthermore, the state of the art (U.S. Pat. No. 6,368,879 B1) includes a process for the manufacture of semiconductor devices, for example transistors, as well as components with integrated circuits, which for example contain transistors. According to this state of the art, manufactured Poly-Gate lines are tested for their line width and a sample average is formed. The sample average is compared with a set value and the manufacturing process is adjusted to increase or decrease the Poly-etching time. A detection of a defect of a tool is not recorded according to this state of the art.

In addition, the state of the art (U.S. Pat. No. 6,449,526 B1) includes a process for an automated manufacture or re-manufacture of tools by grinding the workpieces. According to this state of the art a constant production quality should be maintained and the interference factors such as temperature changes, wear of the grinding wheel and inaccuracies in the mechanical system should be compensated. According to this method belonging to state of the art, a measurement of the workpiece is carried out with sensors to determine whether a further processing of the workpiece is necessary or whether the grinding process can be completed. The measurements carried out during the process allow the detection of a possible defect before scrap is produced. In accordance with the method according to this state of the art, the measurement values are first examined to determine whether and to what extent a feature of interest deviates from a desired value. A follow-up check leads to stabilisation if a prescribed threshold value is exceeded. In addition, a follow-up control may be limited to cases where the characteristic of interest deviates from the desired value at least a prescribed number of consecutive times. This method makes it possible to ignore small deviations from the desired value due to measurement errors caused by the tool or sensor malfunctions. The radial and axial positions thus obtained can be used for further positioning of the workpiece for additional grinding. According to this state of the art, a new positioning of the workpiece is thus carried out. No correction of the tool parameters is performed.

SUMMARY

The technical problem underlying embodiments of the invention is to specify a method for correcting the tool parameters of a machine tool for machining workpieces, which allows the manufacture of workpieces which are automatically produced within the specified tolerance limits or other specified limits without the need for highly qualified personnel.

Embodiments of the invention relate to the field of quality assurance for manufacturing processes. In particular, the embodiments refer to a method for controlling a production plant based on the measurements of the manufactured workpieces of the manufacturing process, the workpiece being defined by nominal data provided, for example, by a technical drawing and/or a CAD model, in order to compensate for the systematic errors in the manufacturing process.

According to one embodiment, a method enables the correction of tool parameters of a machine tool for machining workpieces. Measurement values are recorded as actual values of at least one workpiece machined with the machine tool, and the measurement values are compared with default set values of the workpiece.

In this embodiment, the measurement values of at least two measured characteristics and/or the measurement values of at least two parameters of at least one measured characteristic and/or the measurement values of at least one measured characteristic and of at least one parameter of the same or of one of the measured characteristics are recorded. An average value for a tool correction value is calculated from these measurement values and the corresponding set values. The tool correction value is used to correct the machine tool.

An advantage of the foregoing embodiment that, on the one hand, the machine tool can be subjected to a tool correction fully automatically without the need for highly qualified personnel. On the other hand, the method has the advantage that the measurement values of at least two measured characteristics and/or the measurement values of at least two parameters of a measured characteristic and/or the measurement values of at least one measured characteristic and of at least one parameter of the same or of another measured characteristic are recorded, and that these measurement values are compared with the associated set values and an average value is calculated for the tool correction value. This means that a tool correction value is not determined for a single measured characteristic or a single parameter, which in some circumstances would mean that the tool correction might overcorrect another measured characteristic or another parameter.

The term "measured characteristic of a workpiece" is understood to be a characteristic of the workpiece to be measured, for example a groove, a slot, a bore, a trunnion, or the like. The term "parameters" are understood to be process parameters such as temperature, for example. Parameters can also be understood as machine parameters, such as spindle speed, contact pressure of a tool or the like.

According to an embodiment of the invention, it is provided that a weighted average for the tool correction value is calculated from the measurement values of at least two measured characteristics and/or from the measurement values of at least two parameters of at least one measured characteristic of the same or of another measured characteristic and/or from the measurement values of at least one measured characteristic and at least one parameter.

This embodiment has the advantage that the measured characteristics and/or parameters can be weighted. This means that sensitive measured characteristics or parameters are more strongly included in the tool correction than the measured characteristics or parameters which are not so crucial regarding their tolerances or deviations.

This means that by taking into account different measured characteristics or parameters, a tool correction value can be calculated automatically, which enables a correction of the machine tool, so that all characteristics and parameters are corrected within the tolerance limits or specified limit values without overcorrecting individual measured characteristics and/or parameters.

According to another advantageous embodiment of the invention, it is provided that the measured characteristic and/or the parameter with the smallest tolerance is mostly subject to weighting.

This embodiment ensures that an optimal correction of the measured characteristics and/or parameters is carried out, i.e. that the "most sensitive" measured characteristics and/or parameters are optimally corrected, i.e. ideally close to the nominal value, while less sensitive characteristics and/or parameters are corrected so that the correction lies within the specified limits or tolerance ranges.

According to another advantageous embodiment of the invention, it is provided that each measured characteristic is assigned to at least one machining tool. Each measured characteristic is machined by a machining tool. For example, a bore is produced by means of a drill, or a trunnion is milled from solid material using a milling cutter. A measured characteristic, such as a bore, can also be produced by several machining tools. For example, a bore can be produced by using a drill and then a milling tool. These machining tools are assigned to the measured characteristic. This makes it possible to draw a conclusion about, for example, the wear of the machining tool(s) if the measuring tool deviates from the nominal values.

According to another advantageous embodiment of the invention, it is provided that the tool correction value is calculated smoothly from the last n measurements (with n>1).

For example, the tool correction value can be calculated from the last five, ten or twenty measurements (n=5, n=10, n=20). This embodiment of the method according to the invention has the advantage that a tool correction is not carried out based on a single deviation, but rather a continuous drift is detected with the method according to the invention. This drift is corrected by the tool correction value in the tool.

According to another advantageous embodiment of the invention, the drift is only corrected if the measurement values show a deviation from a given limit value. The correction can also be carried out if the measured measurement values show a deviation in the size of the tolerance value.

Another advantageous embodiment of the invention provides for the tool correction value to be visualised. This enables an operator to view the tool correction value and to monitor it as desired.

Another advantage is that the machine tool correction is carried out fully automatically after determining a tool correction value or after a confirmation or after a confirmation after the visualisation of the tool correction value.

For example, the method according to the invention can be carried out fully automatically. The tool correction values are calculated according to the specifications, for example averaging or weighted averaging, and the machine tool is automatically corrected with the tool correction values.

However, it is also possible that the tool correction value is displayed, for example, and only after a confirmation by an operator is the tool correction value used to correct the machine tool.

Another advantageous embodiment of the invention is that a tool correction is carried out after a continuous drift of a measured characteristic and/or parameter has been detected based on the last n measurements and the measurement values exceed a given limit or a given tolerance value. This method ensures that a tool machine correction is not caused by one-off manufacturing or measuring errors, but rather by a continuous drift, for example when a milling tool wears out over time so that no bores or trunnions can be produced within the tolerance ranges.

It is particularly advantageous that the threshold value, which determines when a tool correction takes place, can be set. For example, a customer can establish when a tool correction is to be carried out.

According to another advantageous embodiment of the invention, it is provided that additional parameters of external factors are taken into consideration when calculating the tool correction value. Such external factors can be, for example, the outside temperature, which affects the dilatation of the machine tool and/or the workpiece.

It is conceivable, for example, that after a machine standstill, e.g. at the weekend or for maintenance purposes, the machine tool has a low temperature, i.e. a temperature below the operating temperature. This can affect the manufacture of the workpieces. For example, if the machine tool returns to its operating temperature during operation, it is not necessary to constantly correct the "operating temperature" parameter. Similarly, an outside temperature can have an influence on the manufacture of the workpieces.

Another advantage is that a work-offset correction is carried out if a threshold value or a tolerance value of the measurement values of a measured feature and/or a parameter is exceeded.

In principle, it is possible to carry out a machine tool correction by changing a travel range or, for example, by compensating a changed travel range of an outwearing spindle drive. However, it is also possible to carry out a work-offset correction.

In the work-offset correction, the work-offset of a measured characteristic or a group of measured characteristics is shunted. A new point of the measured characteristic or a group of measured characteristics is defined as work-offset. The work-offset is the origin of the coordinate system for the measured characteristic or group of measured characteristics.

The work-offset correction is based on the position data of a measured characteristic, which is a grouping of characteristics. For example, the measured characteristic "bore" contains the characteristics "diameter" and "length". The position of different measured characteristics in relation to each other or to a reference point can be corrected.

According to an advantageous characteristic of the invention, it is provided that the measurement of the workpiece is carried out in the machine tool and/or on an external measuring device. It is possible to measure the workpiece after manufacturing if it is still in the machine tool. This is possible, for example, with an articulated arm robot or similar.

However, it is also possible to measure the workpiece on an external measuring device, for example a coordinate measuring device with tactile sensors, optical sensors, roughness sensors or similar.

Another advantageous embodiment of the invention provides for a data record, particularly a CAD data record of the workpiece, to be stored in the machine tool to determine tool correction value. The data record, particularly a CAD data record of the workpiece, serves to provide the machine tool with set values for the workpiece. The data record may also contain tolerance limits.

Based on the data record, the machine tool can manufacture the workpiece.

It is advantageous that the machine tool notifies if the measurement values of the measured characteristics and/or parameters are within the threshold or tolerance values. The machine tool does not only give feedback when a tool correction is made. The machine tool also provides advantageous feedback if the measurement values of the measured characteristics and/or parameters cannot be corrected. This makes it possible to check that the measurement values are being monitored.

Another advantageous embodiment of the invention is that a tool correction value is calculated considering measurement values and/or parameters and considering past measurements. The parameters may be parameters of the measured characteristics, such as the temperature of the workpiece at the measured characteristic, and/or process parameters, such as spindle grinding pressure, and/or parameters of external factors, such as outside temperature.

This characteristic has the advantage that the process parameters can be considered for specific corrections. For example, after a standstill of the machine (after a weekend or maintenance) a temperature correction is more often necessary than during operation. This correction-specific consideration of process parameters is advantageously adapted to past measurements, i.e. it is recognised that after each weekend a temperature correction is required more frequently when the operation is started.

Another advantageous embodiment of the invention is that tool correction values for a first workpiece are transferred to the other workpieces. It is basically possible, for example, that tool correction values are recorded if bores are provided in a first workpiece because, for example, drills or milling cutters wear out. These tool correction values can be transferred for the machining of other workpieces, in which also bores are produced, so that with the tool correction the bores in the other workpieces can be produced indirectly within the tolerance limits or threshold values.

It is advantageously provided that the measurement values are recorded by the machine tool and/or by inline measuring systems and/or by measuring devices, especially coordinate measuring devices, articulated arm or manual measuring devices. The measurement values can be collected by all the devices used in the structure, i.e. by the machine tool itself or by inline measuring systems, i.e. measuring systems located in the machine tool, such as scale monitoring for linear drives in the X, Y or Z direction.

According to another advantageous embodiment, it is provided that a visualisation and/or evaluation of individual measured characteristics and/or parameters and/or tool correction data and/or a tool behaviour is carried out. This makes it possible for an operator, who does not need to be highly specialised, to monitor the various values and take appropriate measures in the event of a gross deviation.

It is advantageously provided that the measured characteristics are grouped according to tools and/or work-offsets.

The work-offset is the origin of the workpiece coordinate system. This work-offset is determined because workpiece blanks are of different sizes and can be tensioned in different locations.

Several work-offsets can be defined for each machining program. The deviation of the position of one or more measured characteristics must correct the assigned offset point by axis. The correction of the offsets can also be calculated by weighting the individual measured characteristics.

Essentially, it can be assumed that the measurement values of the measured characteristics change when the assigned tools wear out, for example. In this case, it is useful to group the measured characteristics by tools so that different measured characteristics that are machined with one and the same tool are corrected.

It is also advantageous that the workpiece is represented in graphics.

On the one hand, this allows the operator to see which tools are available. For example, the wear of tools can also be represented graphically if the tool correction is required for the measured characteristic produced with a specific tool.

According to another advantageous embodiment of the invention, it is provided that when a project is created, a machine tool is selected, all available tools of the machine tool are displayed, a source for the quality data of the workpiece is selected and the quality data are read into the machine tool.

When creating a project that involves the correction of tool parameters, a tool machine can be selected and all available tools for this machine tool are displayed, so that an operator can select the tools, for example. In addition, a source for the quality data of the workpiece is selected either automatically or by an operator, i.e. the basic data of the workpiece to be manufactured are selected, including threshold or tolerance values. These quality data are read into the machine tool to manufacture the workpiece.

Another advantageous embodiment of the invention provides that all available and active machine tools and/or the status of each machine tool and/or the project running on at least one machine tool and/or recent events and/or tool correction values are presented on a display of the machine tool and/or a computer connected to the machine tool. The advantage of this method is that it is possible to determine on which machine tool, which workpiece is being produced and how long the manufacturing process will take so that further or other workpieces can be manufactured at a later date on a currently active machine tool. The information of each project running on the machine tools or the last events and/or tool correction values are also displayed to monitor the machine tool.

The measuring devices used to measure the workpieces include, for example, coordinate measuring devices, articulated arm measuring devices, laser scanners, structural light measuring devices, coat thickness measuring devices, weighing devices, hardness measuring devices, temperature measuring devices or devices for measuring voltages, electric current, electric resistance and/or electric strength.

The machine tool can be, for example, an additive manufacturing machine, a CNC machine, a pressing machine, a rolling machine, a wire and/or sheet bending machine, a wire drawing machine, a grinding and/or polishing machine or a welding machine. The tools can, for example, provide a 3D printing, drilling, turning, milling, cutting, grinding, polishing, pressing, rolling, bending and/or welding function.

According to another advantageous embodiment of the invention, it is possible to determine the remaining time of a tool. If the measurement values of a measured characteristic produced with a certain tool are determined for a certain tool and it is determined that a tool correction is necessary, it can be determined from these data when a tool change will be necessary. This means that the remaining lifespan is determined.

It is also possible to define a threshold based on these measurement values. If the threshold is exceeded, a signal is output that a tool change will be necessary after a certain remaining lifespan or after machining a certain additional number of measured characteristics or workpieces. This means that an imminent tool change is notified. The tool correction values are used to determine the remaining lifespan of a workpiece. If specified limit values of tool correction values are exceeded, an extrapolation is made to determine the remaining running time.

For example, if a tool correction is performed after every 6,000 parts and the tool is usually changed after 50,000 parts, these figures can be used as a basis for verifying the need for a tool change or correction. This means that less frequent measurements are required, for example to determine the remaining lifespan of a tool. For example, it is not necessary to measure after 1,000 parts, but it is sufficient for a tool correction to measure after 5,000 parts to determine whether a tool correction is necessary after 6,000 parts. The change of a tool can be determined in the same way.

According to another advantageous embodiment of the invention, the last n measurements (with n>1) can be used to determine whether an offset of the tool is necessary. In this case no further separate measurement is necessary. The basis of the last n measurements determines when an offset of the tool is necessary.

According to another advantageous embodiment of the invention, it is possible to optimise the working conditions for the tools based on process parameters. For example, the process parameters and the past offset data can be used to determine the conditions under which a tool can be used for a longer period. Thus, tool changes can be delayed. For example, it can be determined that a tool has a longer operating time with only small temperature fluctuations.

It is also possible, for example, to determine the measurement values for a tool via the spindle current of a drive spindle, which can be used to achieve better manufacturing results. For example, a manufacturing speed can be minimised by 10% and the measurement value for determining the tool correction values are used to determine that the reduction in manufacturing speed results in 10% fewer out-of-spec parts, so that overall better manufacturing results can be achieved. The manufacturing process can thus be optimised.

According to another advantageous embodiment of the invention, an extrapolation of tool correction values is carried out considering past measurements. Based on the past measurements, it is possible to predict when a tool is subject to such a high degree of wear that it must be replaced. Based on past measurements, it can be determined, for example, that the tool must be replaced after machining 3,000 workpieces at a time.

BRIEF DESCRIPTION OF THE DRAWINGS

Further characteristics and advantages of the invention are shown in the corresponding drawings, in which different characteristics of a manufacturing plant according to the invention are only shown as examples without limiting the invention to these design examples. In the drawings it is presented.

DETAILED DESCRIPTION

Figure 1:
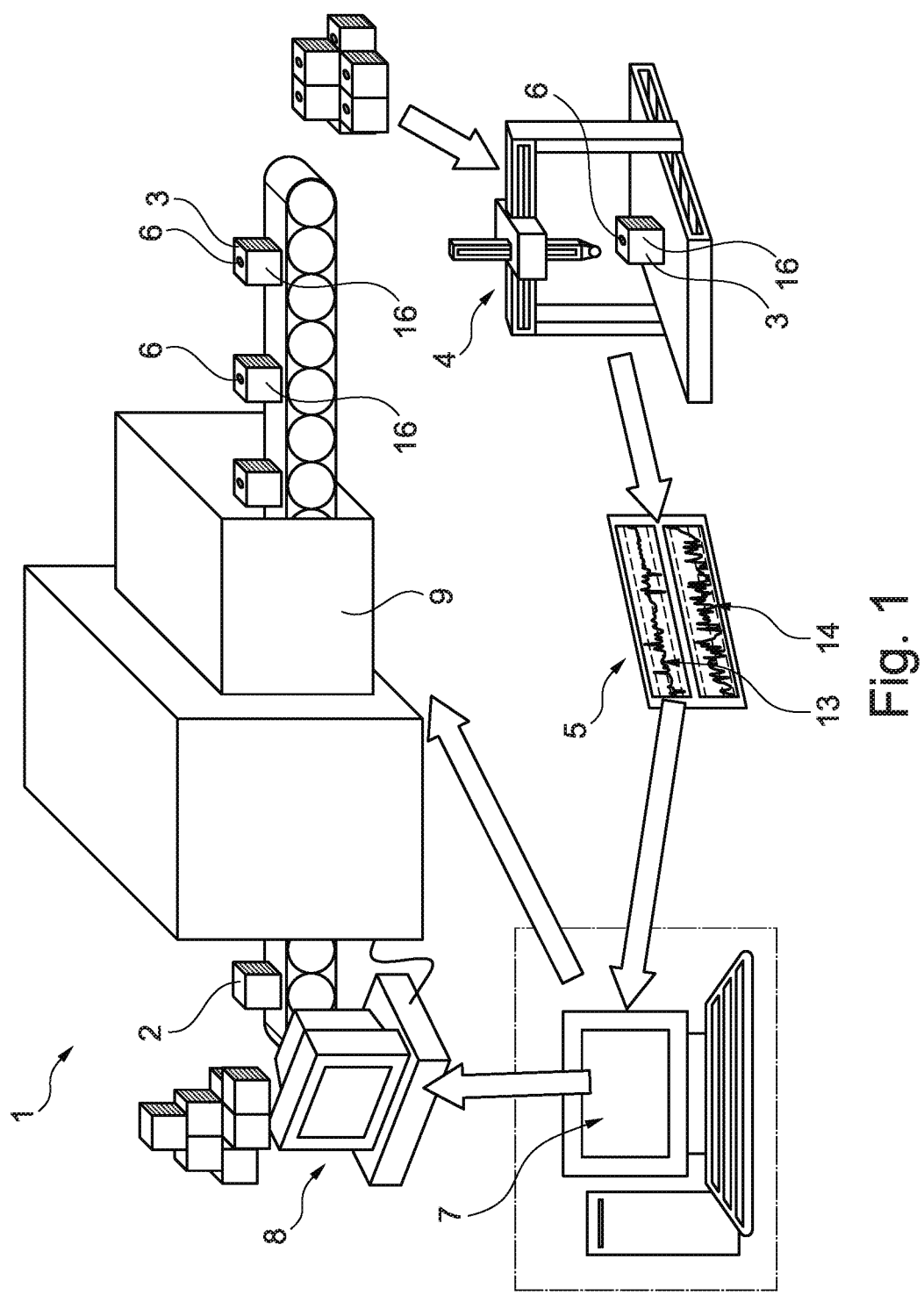
FIG. 1 a schematic representation of a manufacturing process.

FIG. 1 shows a manufacturing plant 1 in which the workpieces 3 are manufactured from the blanks 2, for example by machining with a drill or a milling tool or similar. A measuring device, in this case a coordinate measuring device 4, is used to measure the characteristics of the workpieces 3. These measurement values result in a control chart 5, in which the measurement values are recorded, namely the measurement values 13 and the measurement values 14 of different measured characteristics of the workpiece 3. In the present case, the workpiece 3 has two measured characteristics, namely a bore 6 and a second bore 16. The measurement values of the control chart are transmitted to an analysis unit 7, for example to a computer. The computer analyses the control chart 5. If the values are stable and do not violate a threshold or tolerance value, there is no intervention in the manufacturing process. If the measurement values are not stable, an intervention takes place by further transmitting a correction value, which is determined from the measurement values, to a process control device 8 or directly to the tool machine 9 of the manufacturing plant 1. In the tool machine 9, the tool correction value is used to produce workpieces 3 with a bore 6 or a bore 16, which is within the tolerance range or within default threshold values.

Figure 2:
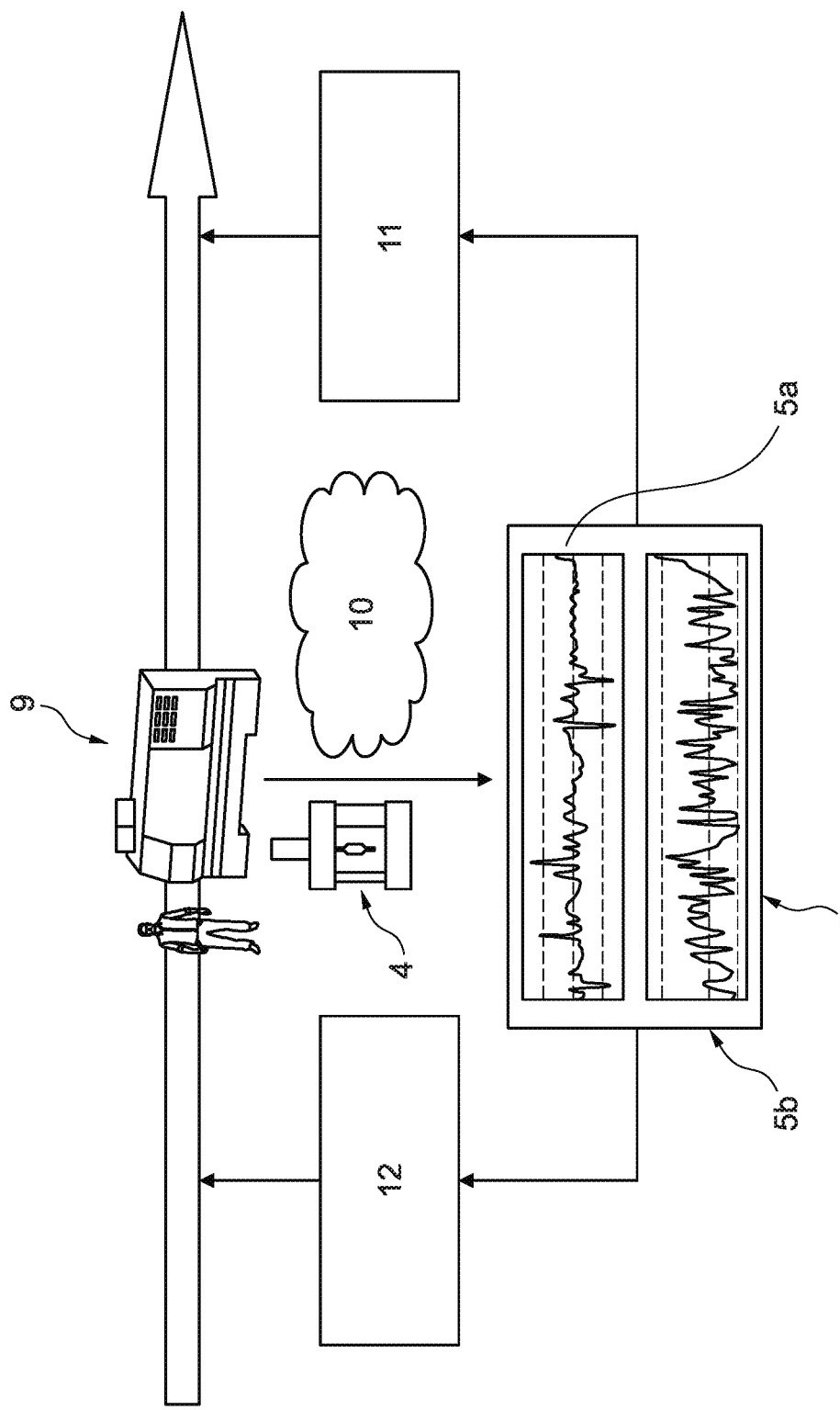
FIG. 2 an overview of the method according to the invention with a control chart.

According to FIG. 2 the measuring machine 9 is shown as well as the coordinate measuring machine 4. The process information 10 is stored in the control chart 5, as already explained. If the control chart is stable, as in the area 5a of the control chart, no action is taken, i.e. process branch 11 continues. If there is a larger deviation of the measurement values from the nominal values, as shown in 5b by the unstable measurement values, the process branch 12, i.e. process intervention is necessary.

Figure 3:
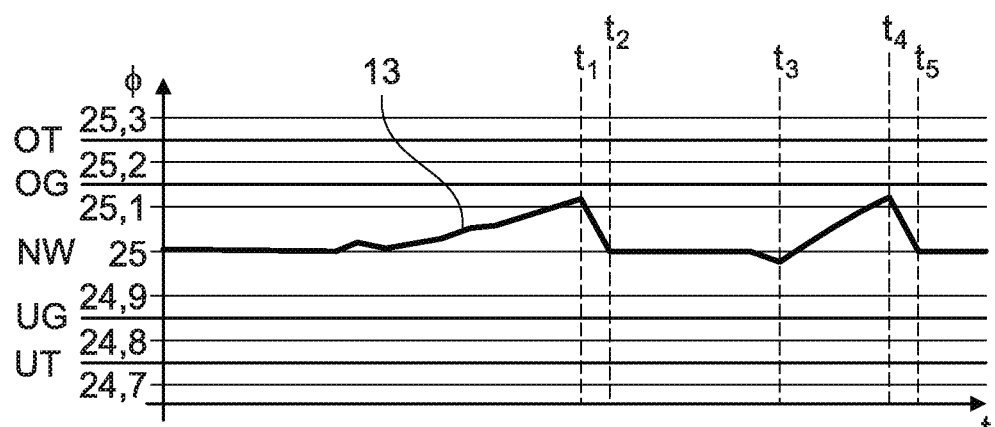
FIG. 3 Measurement values of a trunnion.

FIG. 3 shows a representation of the measurement values 13 of the outer contour of a trunnion. The diameter Ø is plotted against the time t. The nominal value is 25. If a milling tool used to produce the trunnion wears out over time, a drift occurs, which in the example shown runs against a fixed threshold value of 25.15 (OG) at the time t1. At the time t2 a correction is performed so that the measurement values are back to the nominal value. At the time t3 a further wear of the milling head becomes noticeable and the measurement values show again a drift. At the time t4 there is again a maximum approximation to the threshold value 25.15 (OG), so that at the time t5 a correction follows again.

As the milling head wears off, the diameter of the milling head becomes smaller so that the diameter of the trunnion becomes larger.

Figure 4:
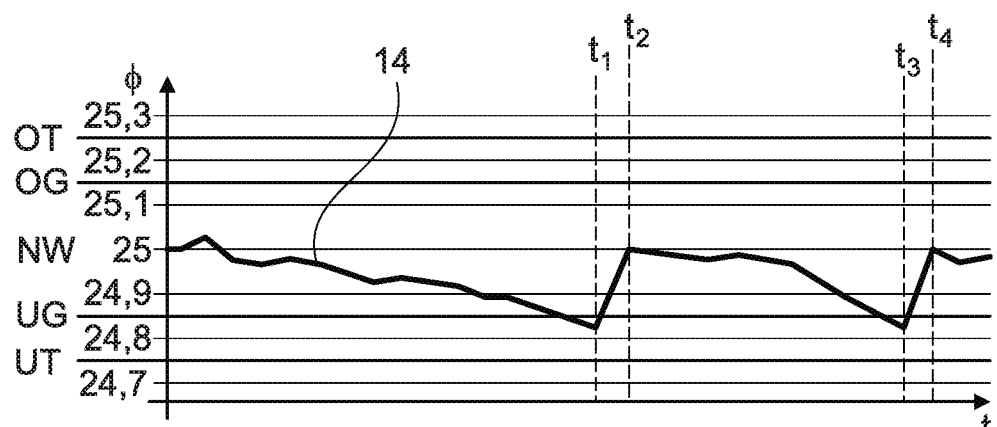
FIG. 4 Measurement values of a slot.

FIG. 4 shows the measurement values of an inner contour of a slot. The diameter Ø is plotted against the time t. Again, the diameter is plotted against time. When the milling head is worn, the inner contour becomes larger and larger so that the inner contour drifts against a threshold value of 24.8 (UG) at the time t1. A correction is made at the time t2. A further wear of the milling head causes the diameter of the inner bore to decrease again until the time t3, when the measurement value (14) of the diameter of the inner contour exceeds the threshold value 24.85 (UG). At the time t4 a correction is performed.

Figure 5:
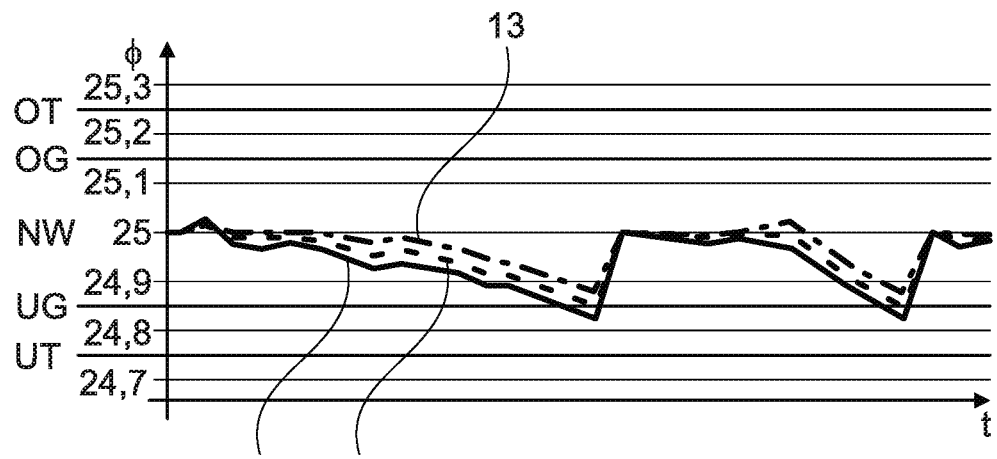
FIG. 5 a correction of the measurement values averaged from the values in FIG. 3 and FIG. 4.

In FIG. 5 the diameter Ø is again plotted against time t. The measurement values 13 in FIG. 3 are mirrored and dotted at the nominal value 25 (NW). The measurement values 14 of FIG. 4 relating to the slot are shown with a solid line. From these measurement values 13, 14 an average 15 is determined, which is shown as a dotted line in FIG. 5. This average 15 forms the tool correction value.

As already mentioned, the nominal value NW is entered in FIGS. 3 to 5 at 25. An upper limit OG is 25.15. A lower limit UG is 24.85. The upper tolerance value OT is 25.25 and the lower tolerance value UT is 24.75.

Instead of the pure averaging as in FIG. 5, a weighting of the characteristics can also be carried out, so that, for example, the tool correction value of the trunnion according to FIG. 3 has a greater weighting than the tool correction value of the slot according to FIG. 4. In this case the average 15 in FIG. 5 is shifted in the direction of the measurement values 13.

Figure 6:
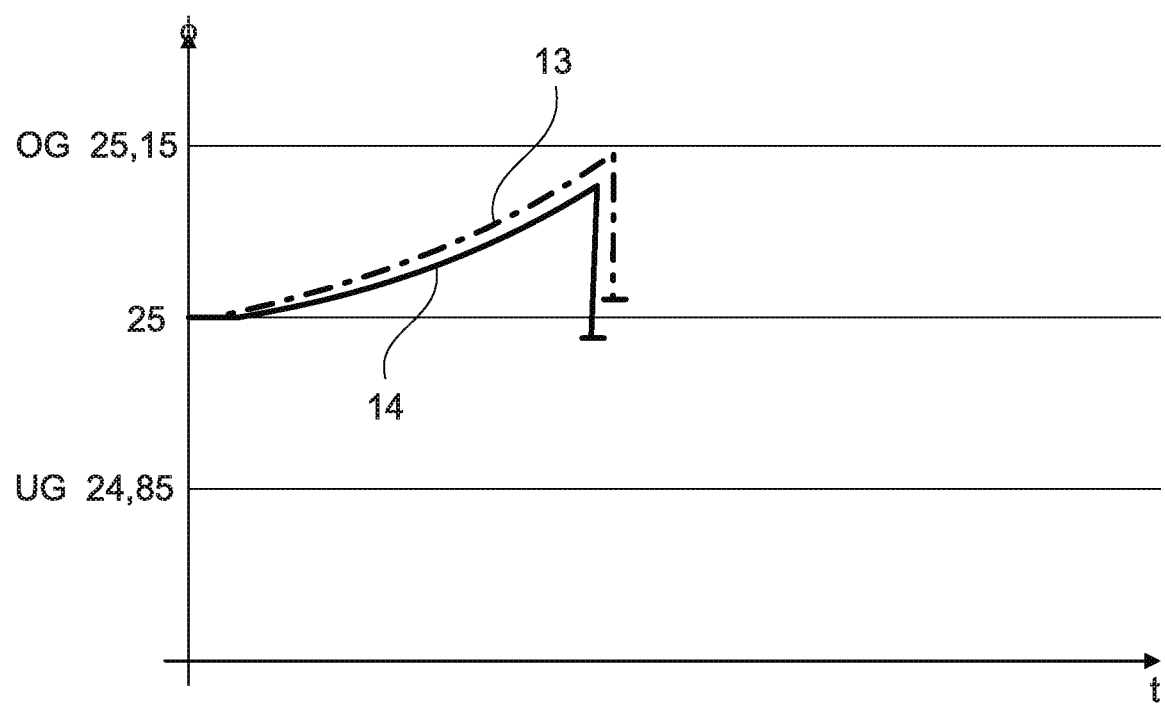
FIG. 6 An enlarged display of the correction of FIG. 5.

As shown in FIG. 6, averaging has an influence on the correction. FIG. 6 shows how the measurement values 13 of FIG. 3 run against the upper limit value OG=25.15, i.e. there is a continuous drift. The correction does not take place up to the nominal value NW=25 as in FIG. 3 but based on the averaging to a nominal value greater than 25, for example 25.05.

Similarly, the measurement values 14 of the slot are corrected based on the averaging in such a way that they are slightly overcorrected, i.e. not to the nominal value NW=25, but to a value below 25, i.e. 24.95 for example.

FIGS. 3 and 4 show the measurement values of various workpieces measured over time t. This means that not a single measurement data record of a characteristic is recorded, but rather the drift is recorded over a certain period of time and/or over a certain number of workpieces or characteristics, for example five or ten characteristics, and then a correction is performed.

FIGS. 3, 4 and 5 define upper tolerance values OT, lower tolerance values UT, upper threshold values OG and lower threshold values UG. The tolerance values OT and UT are specified by the manufacturing specification. The threshold values OG and UG can be defined.

Figure 7:
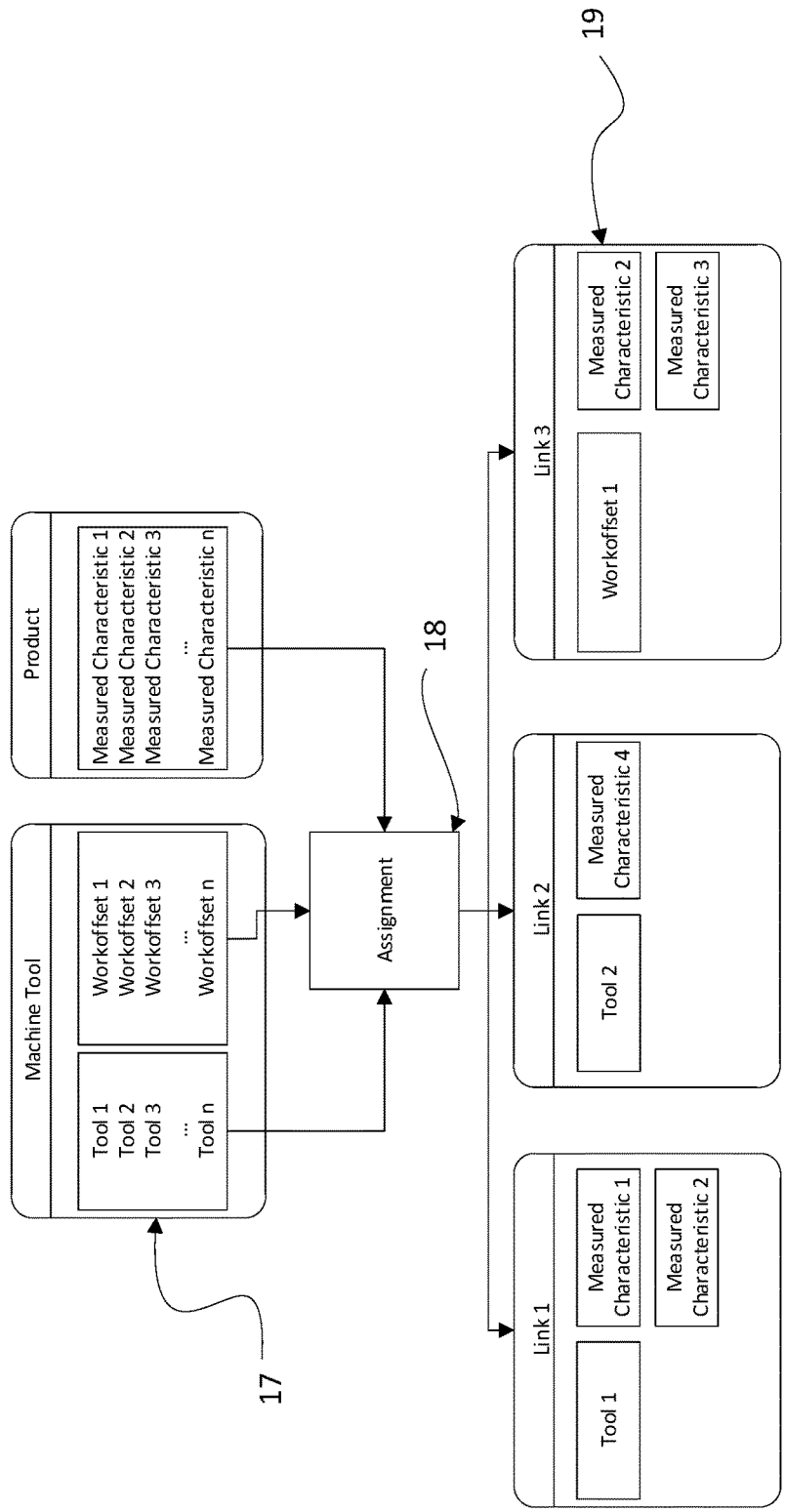
FIG. 7 A flow chart for creating a project.

FIG. 7 shows a flow chart for the creation of a project. In a first step 17, the corresponding tool corrections are defined for the various tools of a machine tool 9 (not shown in FIG. 7). Furthermore, 3 measured characteristics are defined for the various workpieces. These values of the tools, the tool corrections and the measured characteristics are assigned one to another in step 18. The assignment can be done automatically or manually. In processing stage 19, a link is made between the tools and the measured characteristics and between the tool corrections and the measured characteristics.

According to this method, each measured characteristic 6, 16 is assigned to at least one machining operation. Furthermore, the measured characteristics are grouped according to tools and/or work offsets.

When creating a project, a machine tool is selected and all available tools of the machine tool are displayed. Furthermore, a source for the quality data of the workpiece is selected and the quality data are read into the machine tool.

Figure 8:
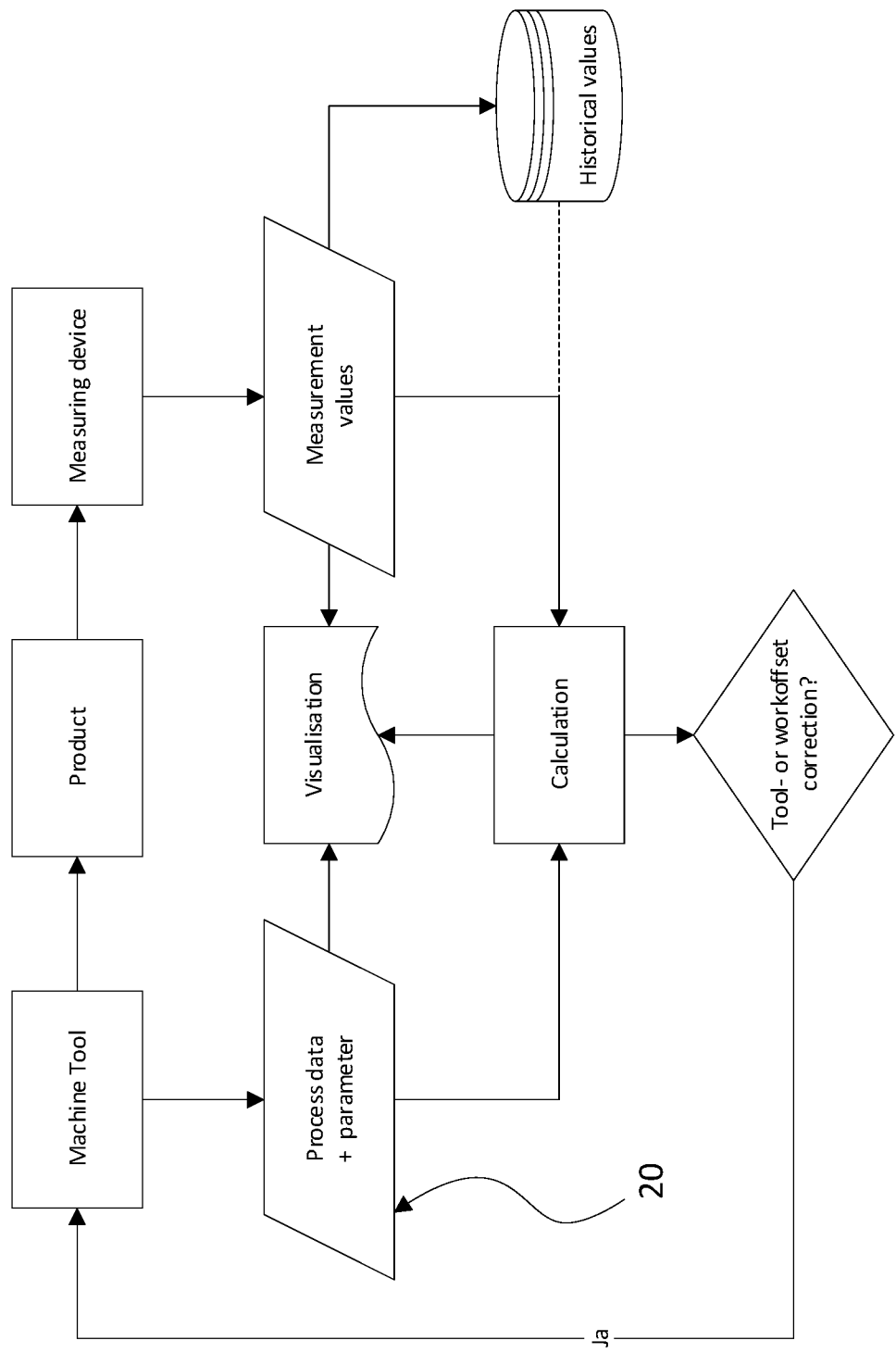
FIG. 8 A flow chart for the visualisation and calculation of tool correction data.

FIG. 8 shows a flow chart for the calculation and visualisation of tool correction data. According to FIG. 8, parameters such as process parameters or process data of the external factors are also considered in step 18 when calculating the tool correction value.

If a threshold value (OG, UG) or a tolerance value (OT, UT) of the measurement values of a measured characteristic and/or a parameter is exceeded, an offset correction or a tool correction is carried out.

Measurement values are archived from past measurements. These are stored and saved as historical measurement values. A tool correction value can be calculated considering the measurement values and/or parameters and considering the past measurements (historical measurement values).

Furthermore, a visualisation and evaluation of individual measured characteristics and/or parameters and/or tool correction data and/or tool behaviour is carried out. The tools can be represented in graphics upon visualisation.

When creating a project, a machine tool is selected and all available tools of the machine tool are displayed. In addition, a source for the quality data of the workpiece is selected and the quality data is read into the machine tool.

Figure 9:
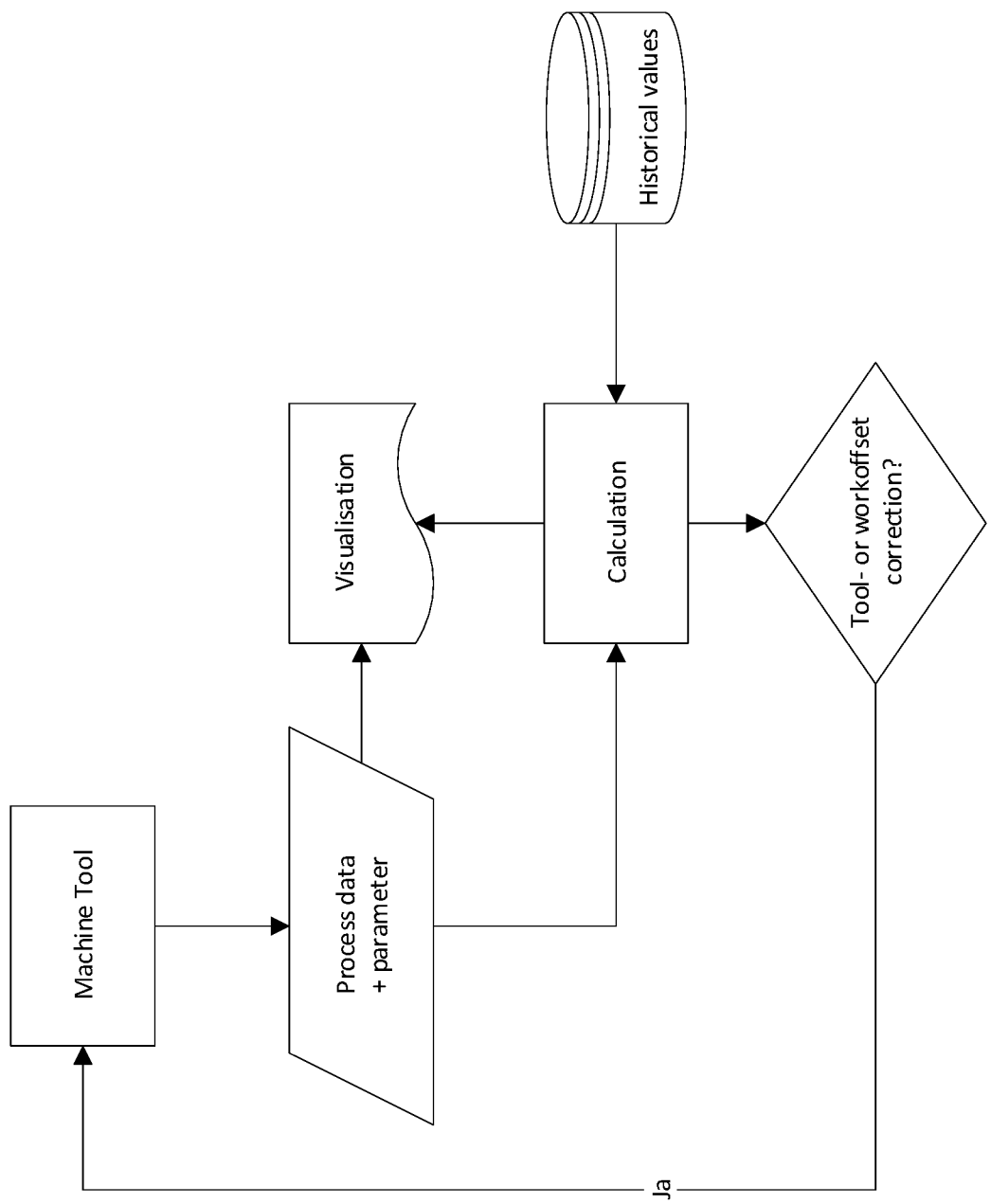
FIG. 9 A flow chart for the extrapolation of tool correction values.

FIG. 9 shows a flow chart for the extrapolation of the tool correction values. According to this design example, an extrapolation of the tool correction values is carried out, considering the past measurements. Based on the past measurements, for example, a point can be made as to when a tool is subject to such great wear that it must be replaced. Based on the past measurements, it can be determined, for example, that the tool must be replaced after machining 5,000 workpieces at a time. This value is included in the calculation and an analysis unit decides whether a tool- or work-offset correction is to be carried out.

It is also possible to transfer tool correction values for a first workpiece to other workpieces.

REFERENCE FIGURES

1 Manufacturing plant
2 Blanks
3 Workpiece
4 Coordinate measuring device
5 Control chart
5a Stable measurement values
5b Unstable measurement values
6 Measured characteristic
7 Analysis unit
8 Process control device
9 Machine tool
10 Process information
11 Process branch
12 Process branch
13 Measurement value trunnion
14 Measurement value inside slot
15 Average
16 Bore
17 Process step
18 Process step
19 Processing stage
OT Upper tolerance value
UT Lower tolerance value
OG Upper threshold value
UG Lower threshold value
NW Nominal value

The invention claimed is:

1. A method for the correction of tool parameters of a machine tool for machining workpieces, comprising:
   recording measurement values of measured characteristics as actual values of at least one workpiece machined with the machine tool;
   comparing the measurement values with default set values of the workpiece, wherein the measurement values that are recorded relate to at least one of:
      at least two measured characteristics;
      at least two parameters of at least one measured characteristic; and
      at least one measured characteristic and of at least one parameter of the same or one of another measured characteristic;
   calculating an average for a tool correction value from the measurement values and associated set values; and
   correcting the machine tool using the tool correction value,
   wherein a weighted average for the tool correction value is calculated from the measurement values; and
   wherein the measured characteristic and/or the parameter with the smallest tolerance is used most strongly in calculating the weighted average.

2. The method according to claim 1, further comprising: performing an assignment of each measured characteristic to at least one machining tool.

3. The method according to claim 1, wherein the tool correction value is calculated continuously from the last n measurements (with n>1).

4. The method according to claim 1, further comprising: visualizing the tool correction value.

5. The method according to claim 4, wherein correcting the machine tool is performed automatically after determining the tool correction value or after confirmation after visualizing the tool correction value.

6. The method according to claim 1, wherein correcting the machine tool is performed after a continuous drift of the measurement values of a measured characteristic and/or a parameter has been detected based on the last n measurements and the measurement values exceed a default threshold value (OG, UG) or a default tolerance value (OT, UT).

7. The method according to claim 6, wherein the threshold value (OG, UG) can be determined.

8. The method according to claim 1, wherein the tool correction value is calculated by considering additional parameters of external factors.

9. The method according to claim 1, further comprising: performing an offset correction when a threshold value (OG, UG) or a tolerance value (OT, UT) of the measurement values of a measured characteristic and/or a parameter is exceeded.

10. The method according to claim 1, further comprising: measuring the workpiece in the machine tool and/or on an external measuring device.

11. The method according to claim 1, further comprising: storing a CAD data record of the workpiece in the tool machine for determining the tool correction value.

12. The method according to claim 1, further comprising: making notification by the machine tool if the measurement values of the measured characteristics and/or parameters are within threshold values (OG, UG) or tolerance values (OT, UT).

13. The method according to claim 1, wherein the tool correction value is calculated considering the measurement values and/or parameters and considering past measurements.

14. The method according to claim 1, further comprising: performing an extrapolation of the tool correction values by taking into account past measurements.

15. The method according to claim 1, further comprising: transferring tool correction values for a first workpiece to other workpieces.

16. The method according to claim 1, wherein the measurement values are recorded from at least one of:
the machine tool;
an in-line measuring system; and
a coordinate measuring device, an articulated arm, a manual measuring device, or another external measuring device.

17. The method according to claim 1, further comprising:
performing a visualisation and evaluation of at least one of:
individual measured characteristics;
parameters;
tool correction data; and
tool behaviour.

18. The method according to claim 1, further comprising:
grouping the measured characteristics according to tool- and/or workpiece-offsets.

19. The method according to claim 1, further comprising:
representing the machine tool and other available machine tools in graphics.

20. The method according to claim 1, further comprising:
selecting the machine tool when a project is created;
displaying all available machine tools;
selecting a source for quality data of the workpiece; and
reading the quality data in the machine tool.

21. The method according to claim 1, further comprising:
displaying on a display or computer associated with the machine tool, at least of:
all available machine tools;
a status of each available machine tool;
a project running on the machine tool;
recent events; and
correction values.

* * * * *